(12) United States Patent
Inui et al.

(10) Patent No.: US 8,191,443 B2
(45) Date of Patent: Jun. 5, 2012

(54) REVERSE INHIBITOR MECHANISM FOR REGULATING AUTOMATIC TRANSMISSION GEAR SHIFTING, AND METHOD OF ASSEMBLING SAME

(75) Inventors: Hiroatsu Inui, Saitama (JP); Hiromi Sumi, Saitama (JP); Shinya Koyama, Saitama (JP); Eiji Kittaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1268 days.

(21) Appl. No.: 11/974,661

(22) Filed: Oct. 15, 2007

(65) Prior Publication Data

US 2008/0103020 A1    May 1, 2008

(30) Foreign Application Priority Data

Oct. 31, 2006   (JP) ................... 2006-296966

(51) Int. Cl.
*B60K 20/00* (2006.01)
(52) U.S. Cl. ................... 74/473.22; 74/473.37
(58) Field of Classification Search .......... 74/473.1, 74/473.21, 473.22, 473.23, 473.36, 473.37
See application file for complete search history.

(56) References Cited

U.S. PATENT DOCUMENTS

| | | | | |
|---|---|---|---|---|
| 4,301,692 A | * | 11/1981 | Frazee | 74/473.28 |
| 4,624,350 A | * | 11/1986 | Akashi | 192/220 |
| 4,635,506 A | * | 1/1987 | Imaizumi et al. | 74/745 |
| 4,655,309 A | * | 4/1987 | Imaizumi et al. | 180/215 |
| 4,704,923 A | * | 11/1987 | Taylor | 475/73 |
| 6,370,976 B1 | * | 4/2002 | Doppling et al. | 74/337.5 |
| 6,453,767 B1 | * | 9/2002 | Willemsen et al. | 74/512 |
| 6,516,686 B1 | * | 2/2003 | Hori et al. | 74/730.1 |
| 2005/0087032 A1 | * | 4/2005 | Kawakubo et al. | 74/473.1 |
| 2005/0211526 A1 | * | 9/2005 | Averill et al. | 192/48.3 |
| 2007/0144292 A1 | * | 6/2007 | Koyama et al. | 74/473.16 |
| 2009/0205455 A1 | * | 8/2009 | Kosugi | 74/473.21 |

FOREIGN PATENT DOCUMENTS

GB    2278653 A    * 12/1994
JP    2004-036584    2/2004

* cited by examiner

*Primary Examiner* — Thomas B Will
*Assistant Examiner* — Abigail A Risic
(74) *Attorney, Agent, or Firm* — Carrier Blackman & Associates, P.C.; Joseph P. Carrier; William D. Blackman

(57) ABSTRACT

A reverse inhibitor mechanism for a transmission of an all terrain vehicle, in which a shift drum is jounalled to a side wall opposite the transmission case so as to be rotatably supported thereon, and a reverse inhibitor arm is detachably engaged with the reverse inhibitor groove formed in the outer circumferential surface of the shift drum to regulate a reverse setting. A reverse inhibitor shaft having the reverse inhibitor arm supported at one end thereof is positioned within the transmission case. The other end of the reverse inhibitor shaft is rotatably journaled to one of the opposite side walls of the transmission case from the inside of the transmission case. A distal end of the reverse inhibitor arm which swings by the rotation of the reverse inhibitor shaft is brought into engagement with the reverse inhibitor groove during assembly of the reverse inhibitor mechanism.

12 Claims, 8 Drawing Sheets

REVERSE INHIBITOR MECHANISM FOR REGULATING AUTOMATIC TRANSMISSION GEAR SHIFTING, AND METHOD OF ASSEMBLING SAME

CROSS-REFERENCE TO RELATED APPLICATIONS

The present application claims priority under 35 USC §119 based on Japanese patent application No. 2006-296966, filed on Oct. 31, 2006. The entire subject matter of this priority document is herein incorporated by reference.

BACKGROUND OF THE INVENTION

1. Field of the Invention

The present invention relates to a reverse inhibitor mechanism for regulating a gear shifting operation of an automatic transmission. More particularly, the present invention relates to a method of assembling the reverse inhibitor mechanism.

2. Description of the Background Art

There are several known reverse inhibitor mechanisms which regulate gear shifting operation of an automatic transmission. An example of such reverse inhibitor mechanism is disclosed in Japanese published patent document JP-A No. 2004-36584.

According to the Japanese published patent document JP-A No. 2004-36584, as shown in FIG. 8 thereof, a shift drum is rotatably journaled between opposing front and rear side walls of a transmission case. A reverse inhibitor groove is formed in a shaft end portion of the shift drum. A distal end portion of a reverse inhibitor arm is detachably engaged with the reverse inhibitor groove. The shift drum protrudes rearwardly from the rear side wall of the transmission case.

The reverse inhibitor arm has a proximal end portion fitted with a reverse inhibitor shaft. The reverse shaft is rotatably journaled to a rear side wall of the transmission case and a rear case cover of a power unit. The reverse inhibitor arm is urged by a spring in the direction where the distal end portion is engaged with the reverse inhibitor groove of the shift drum.

When the reverse is not set, i.e., when the transmission gear is not set in a reverse position, the distal end portion of the reverse inhibitor arm is engaged with the reverse inhibitor groove by the spring. Upon shifting (changing) of gears during the normal forward traveling operation, except the reverse (backward traveling operation), the reverse inhibitor arm is engaged with the reverse inhibiting groove to regulate the rotation of the shift drum, thereby inhibiting setting of the reverse rotation angle (setting the reverse).

Upon selection of the reverse position, the reverse inhibitor shaft is rotated to swing the reverse inhibitor arm against the force of the spring so as to be disengaged from the reverse inhibitor groove. This makes it possible to set the reverse rotation angle of the shift drum.

The reverse inhibitor mechanism is configured to have its reverse inhibitor shaft together with the reverse inhibitor arm disposed outside the transmission case, i.e., the reverse inhibitor mechanism is situated at the rear side wall of the transmission case and the rear case cover.

Assembling of the reverse inhibitor mechanism according to the Japanese published patent document JP-A No. 2004-36584 includes penetrating the bearing portion of the rear case cover by the rear end portion of the reverse inhibitor shaft, when the rear case cover is applied for covering in the state where the front end of the reverse inhibitor shaft is fitted with the bearing portion of the rear side wall of the transmission case.

Alternatively, assembly of the reverse inhibitor mechanism is performed by fitting the front end portion of the reverse inhibitor shaft with the bearing portion of the rear side wall of the transmission case while penetrating the rear end portion of the reverse inhibitor shaft into the bearing portion of the rear case cover. That is, the reverse inhibitor shaft is fixed at two positions, the front end in the rear side wall and the rear end in the rear case cover.

The temporary assembled state where one end portion of the reverse inhibitor shaft is journaled to the bearing portion is unstable because the only shaft end portion is supported. It is not easy to insert the other end portion of the reverse inhibitor shaft into the predetermined bearing portion by coinciding with the center of the shaft while engaging the reverse inhibitor arm with the reverse inhibitor groove for covering the rear side wall of the transmission case with the rear case cover. This may occasionally cause the reverse inhibitor shaft to be disengaged in contact with certain elements, and the reverse inhibitor shaft may fall off.

The reverse inhibitor arm is disposed outside the transmission case, and the reverse inhibitor groove in engagement with the reverse inhibitor arm is further formed in the outer side of the bearing portion of the shift drum, which may enlarge the shift drum itself.

Therefore, system and assembling method for the reverse inhibitor mechanism is required to be improved while compacting the size of the shift drum. In view of the above-described points, it is an object of the present invention to provide a reverse inhibitor mechanism of a transmission, which improves the assembly workability and reduces the size of the shift drum.

SUMMARY OF THE INVENTION

In order to achieve the aforementioned object, the present invention according to a first aspect provides a reverse inhibitor mechanism for an automatic transmission, in which a shift drum for operating a shift fork is journaled to a side wall opposite a transmission case so as to be rotatably supported, and a reverse inhibitor arm is detachably engaged with a reverse inhibitor groove formed in an outer circumferential surface of the shift drum for regulating a reverse setting. A reverse inhibitor shaft, having a reverse inhibitor arm supported (may be integrally supported) at one end portion thereof, is rotatably journaled by penetrating one of the opposite side walls of a transmission case from inside while keeping the reverse inhibitor arm positioned within the transmission case. A distal end portion of the reverse inhibitor arm which swings by a rotation of the reverse inhibitor shaft is brought into engagement with the reverse inhibitor groove.

Further, the present invention according to a second aspect provides the reverse inhibitor arm integrated with the reverse inhibitor shaft. The reverse inhibitor arm is urged by an urging spring (torsion spring) to swing towards the outer circumferential surface of the shift drum, and particularly towards the reveres inhibitor groove of the shift drum.

Furthermore, the present invention according to a third aspect provides the reverse inhibitor shaft having an end portion (first end portion) with a diameter larger than the other end portion (second end portion) thereof. The reverse inhibitor arm is fitted to the first end portion. The diameter of the shaft generally decreases from the first end portion to the second end portion.

According to the first aspect of the present invention, the reverse inhibitor shaft is penetrated into one of the side walls of the transmission case from the inside portion thereof so as to be rotatably journaled while holding a proximal end of the reverse inhibitor arm positioned in the transmission case. At the same time, the distal end portion of the reverse inhibitor arm is engaged with the reverse inhibitor groove of the shift drum. This allows assembling both the reverse inhibitor shaft and the reverse inhibitor arm from inside of the transmission case without holding the reverse inhibitor shaft in the unstable temporary assembled state, resulting in the excellent assembly workability of the reverse inhibitor mechanism.

As the reverse inhibitor arm is disposed in the transmission case, the reverse inhibitor groove and transmission lead grooves are formed on the outer circumferential surface of the shift drum. This makes it possible to make the shift drum compact.

According to the second aspect of the present invention, the reverse inhibitor arm (which may be integrated with the reverse inhibitor shaft) is urged by the urging member having an urging spring (also referred as a torsion spring) to swing towards the outer circumferential surface of the shift drum. The urging member is installed simultaneously while assembling the reverse inhibitor shaft such that the urging spring maintains the state where the reverse inhibitor arm is engaged with the reverse inhibitor groove formed on the shift drum. This makes it possible to temporarily fix, i.e., axially positioned the reverse inhibitor shaft, thus improving the assembly operation.

Further, according to the third aspect of the present invention, the diameter of one end portion (first end portion) of the reverse inhibitor shaft having the reverse inhibitor arm fitted thereon is larger than that of the other end portion (second end portion) of the reverse inhibitor shaft. This results in weight reduction of the reverse inhibitor shaft, and further improves the assembly operation of the reverse inhibitor shaft.

For a more complete understanding of the present invention, the reader is referred to the following detailed description section, which should be read in conjunction with the accompanying drawings.

DETAILED DESCRIPTION OF ILLUSTRATIVE EMBODIMENTS

It should be understood that only structures considered necessary for illustrating selected embodiments of the present invention are described herein. Other conventional structures, and those of ancillary and auxiliary components of the system, will be known and understood by those skilled in the art.

The illustrative embodiments of the present invention are described with reference to accompanying FIGS. 1 to 8. In these illustrative embodiments, the front-to-rear, and the left-to-right directions are determined based on the forward normal traveling direction of the vehicle, e.g., the forward traveling direction of the vehicle is a front direction.

Figure 1:
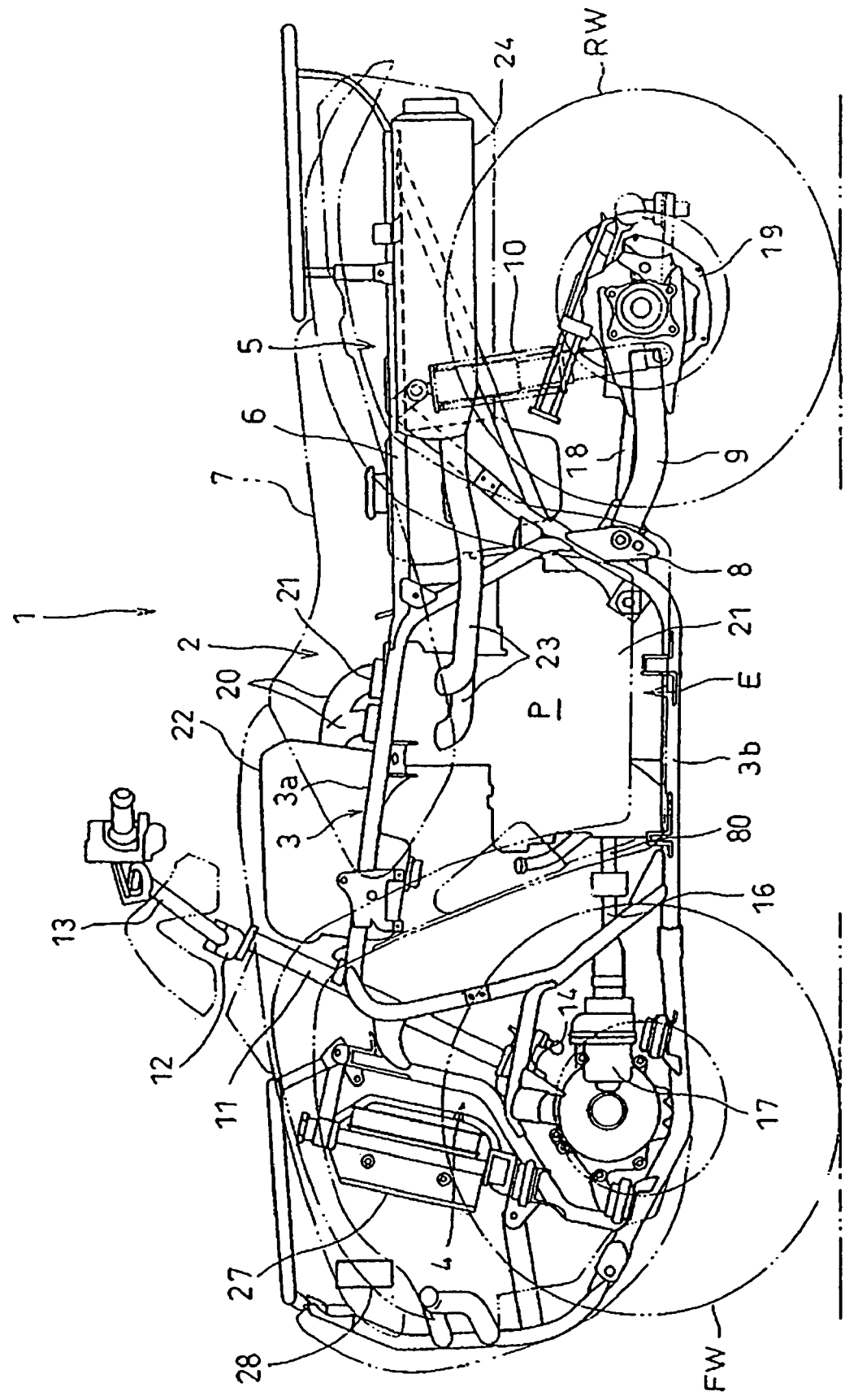
FIG. 1 is a side view of an all terrain vehicle without a vehicle body cover.
Figure 2:
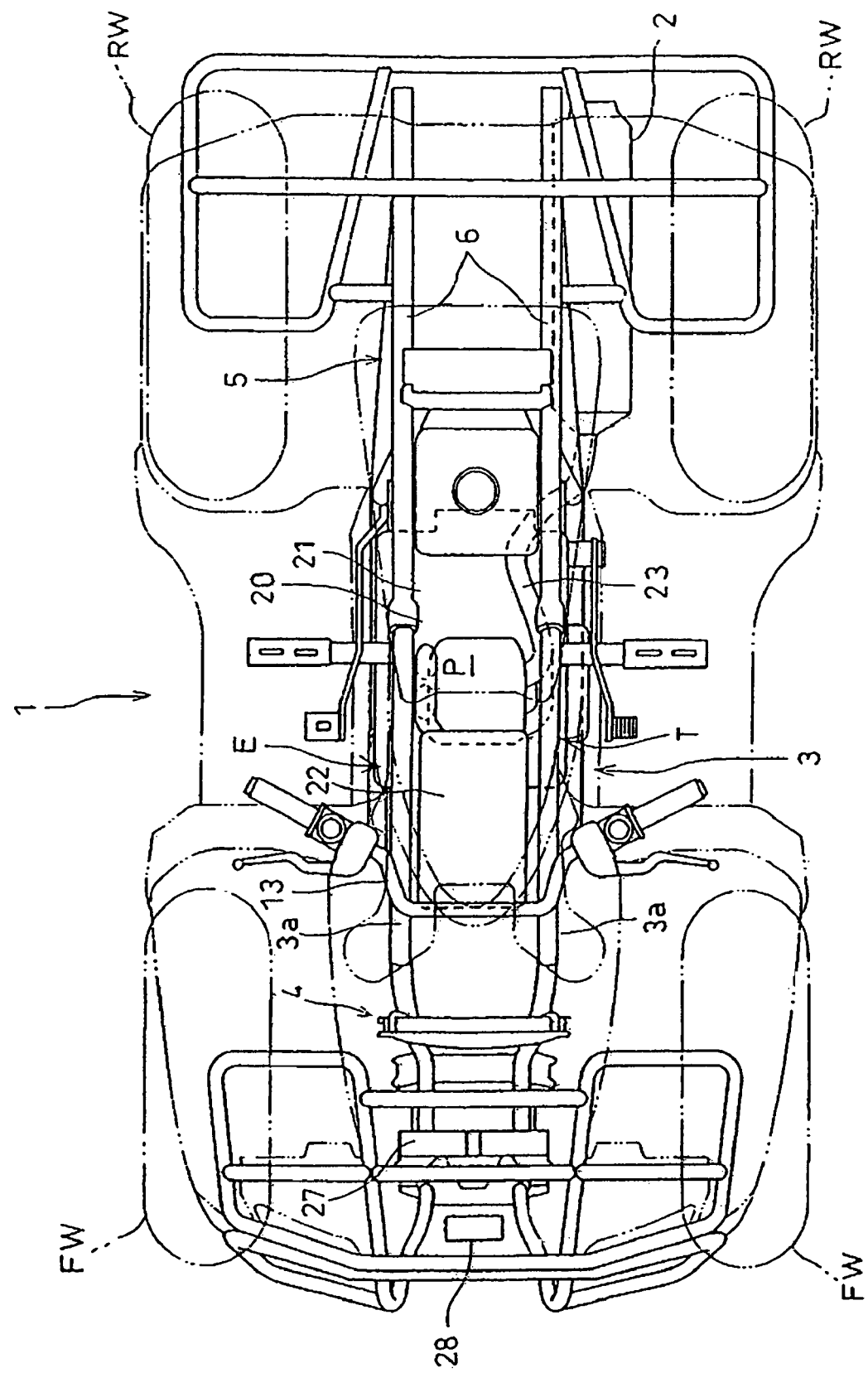
FIG. 2 is a plan view of the all terrain vehicle of FIG. 1.

FIG. 1 is a side view of an all terrain vehicle 1 having a water-cooled internal combustion engine E mounted thereon. In the FIG. 1, a vehicle body cover is removed to show features of the all terrain vehicle. FIG. 2 is a plan view of the all terrain vehicle of the FIG. 1.

The all terrain vehicle 1 is a four-wheeled saddle-ride type vehicle. The vehicle 1 includes a body frame 2, a pair of left and right front wheels FW mounted with low pressure all terrain balloon tires, and a pair of left and right rear wheels RW mounted with the same low pressure balloon tires. The front wheels FW and rear wheels RW are suspended across the front and rear widths of the body frame 2, respectively.

The body frame 2 is formed by combining a plurality of frames formed of material having metal such as steel. The plurality of frames includes a center frame 3, a front frame 4 attached to a front portion of the center frame 3, and a rear frame 5 attached to a rear portion of the center frame 3. The rear frame 5 includes a seat rail 6 for supporting a seat 7. The front frame 4 suspends (holds) the front wheels WF.

The center frame 3 receives a power unit P therein. The power unit includes an integrated structure of the internal combustion engine E and a transmission unit T disposed in a crankcase 31.

The center frame 3 is formed of a pair of left and right upper pipes 3a and a pair of left and right lower pipes 3b. The upper pipes 3a and lower pipes 3b are linked with a cross member. Specifically, front and rear end portions of each of the upper pipes 3a are bent forward to form substantially three sides, and the lower pipes 3b connect the front and the rear end portions, respectively as the other side to form substantially a rectangular shape as shown in a FIG. 1.

A swing arm 9, having its front end journaled, is swingably connected to a pivot plate 8 fixed to a rear bent portion of the lower pipe 3b, which extends in the upper diagonal direction. A rear cushion 10 is interposed between the rear portion of the swing arm 9 and a portion of the rear frame 5. The rear wheels RW are suspended to a rear final reduction gear unit 19 disposed at the rear end of the swing arm 9.

A steering column 11 is supported at a center of the width of the cross member suspended between the front end portions of the left and the right upper pipes 3a. A steering handle 13 is linked to the upper end of a steering shaft 12 steerably supported at the steering column 11. A front wheel steering mechanism 14 is linked to the lower end of the steering shaft 12.

The internal combustion engine E of the power unit P is a water-cooled 2-cylinder internal combustion engine. The power unit is mounted on the center frame 3 in the vertical position such that a crankshaft 30 of the engine E is orientated in the longitudinal direction of the vehicle body.

The transmission unit T of the power unit P is disposed on the left side of the internal combustion engine E. An output shaft 80 oriented in the longitudinal direction extending longitudinally from the transmission unit T at the left side of the vehicle 1. The rotating power of the output shaft 80 is transmitted from its front end to the left and right front wheels FW via a front drive shaft 16 and a front final reduction gear unit 17, and from its rear end to the left and right rear wheels RW via a rear drive shaft 18 and the rear final reduction gear unit 19.

A radiator 27 is supported at the front frame 4 of the vehicle body frame 2. An oil cooler 28 is provided on the front of the radiator 27.

Figure 3:
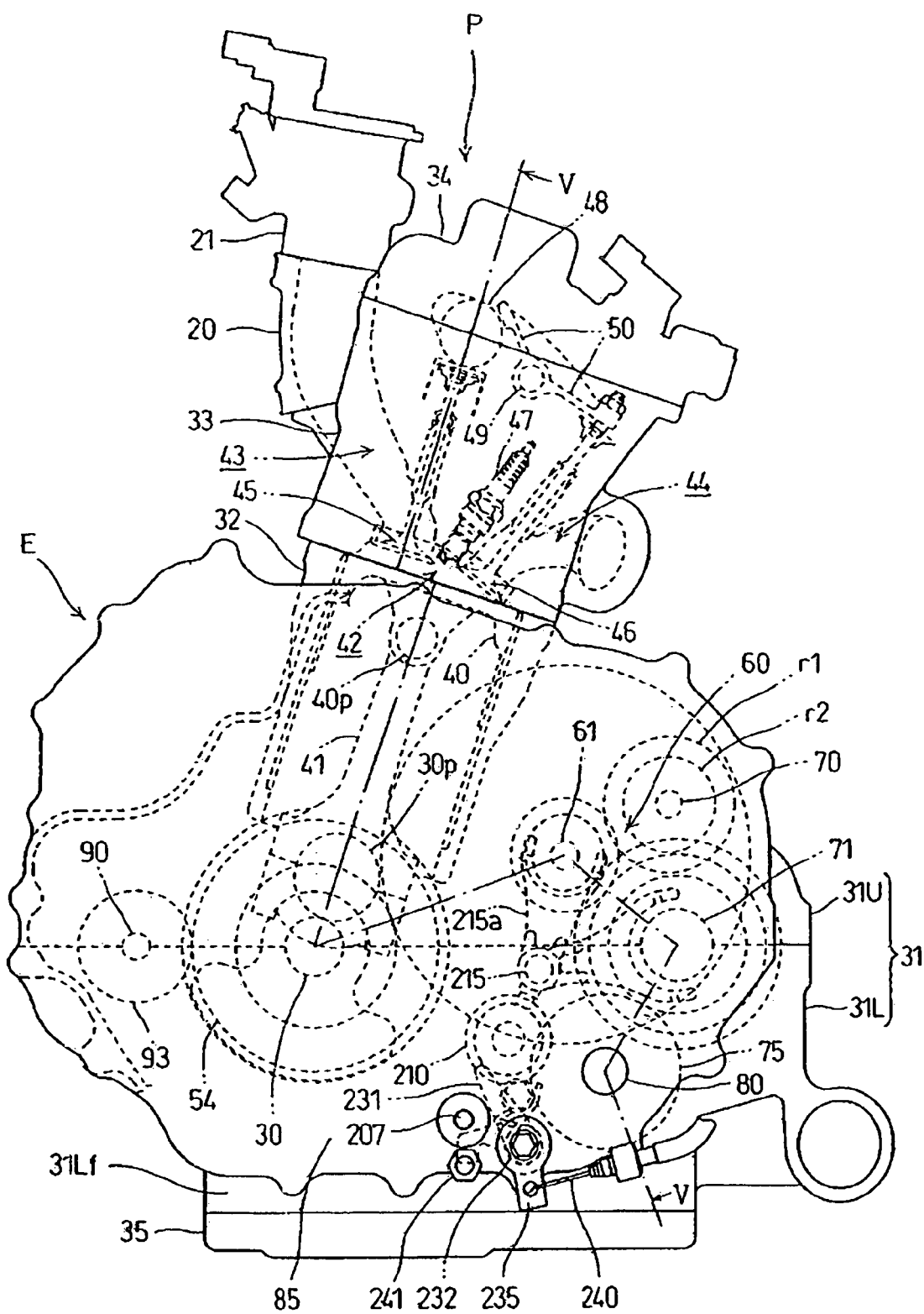
FIG. 3 is a front view of a power unit of the all terrain vehicle.
Figure 4:
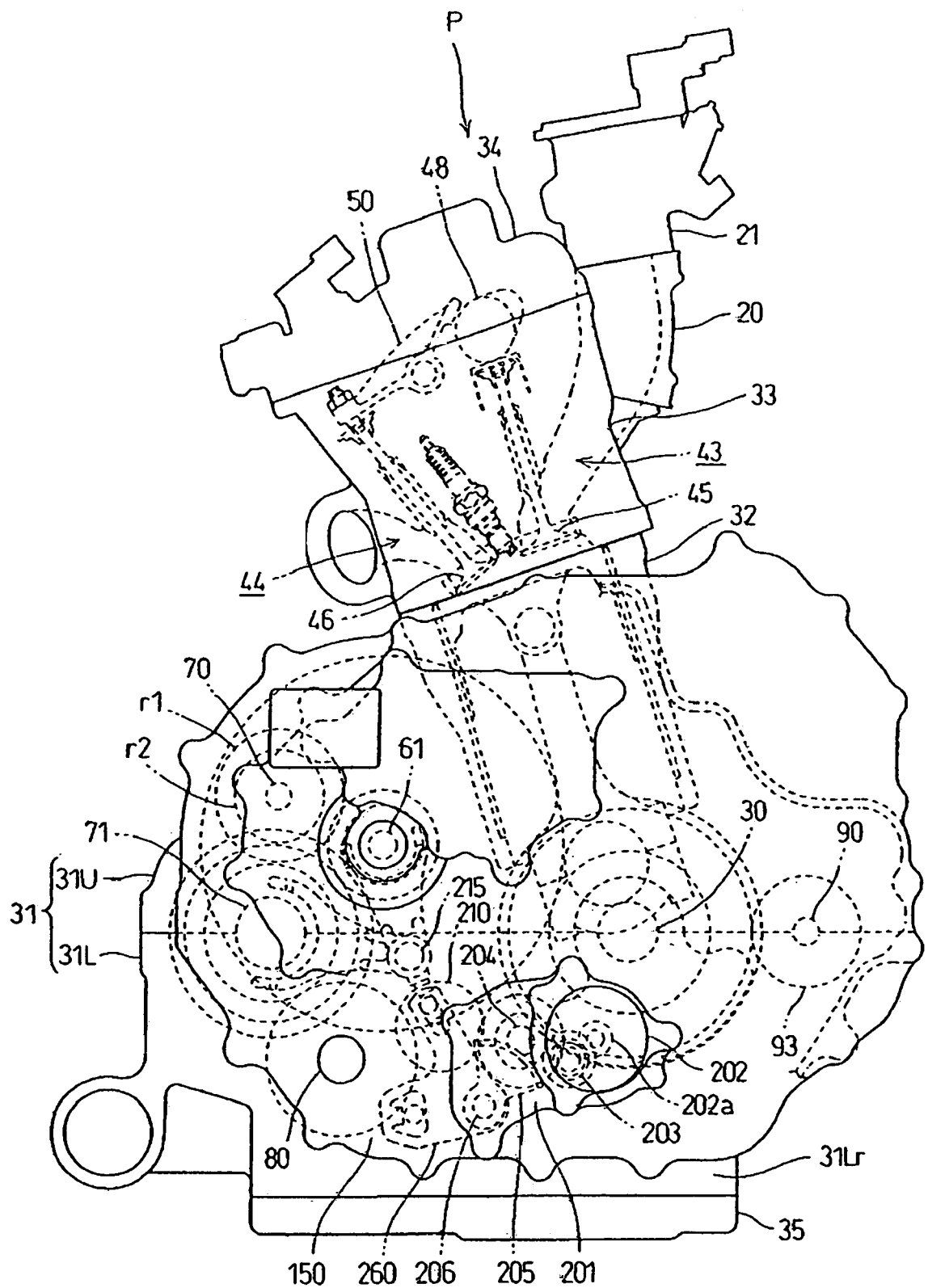
FIG. 4 is a rear view of the power unit of the all terrain vehicle.

Referring to FIGS. 3 and 4, as front and rear views of the power unit P, the crankcase 31 which contains the power unit P including the internal combustion engine E and the transmission T unit is split into upper and lower portions on a plane including the crankshaft 30. In other words, the crankcase 31 is split into the upper crankcase 31U and the lower crankcase 31L at a plane defined by the crankshaft 30.

A cylinder block portion 32 formed by integrally molding serially arranged two cylinder bores 32c extends upward in a slight tilted position to the left from the upper portion of the upper crankcase 31U. A cylinder head 33 is stacked on the cylinder block portion 32, and the cylinder head 33 is covered with a cylinder head cover 34. An oil pan 35 is disposed below the lower crankcase 31L.

An intake pipe 20 which bends to extend in substantially upward direction from the right side wall of the cylinder head 33 is connected to an air cleaner 22 disposed above the internal combustion engine E while interposing a throttle body 21 at an intermediate position. An exhaust pipe 23 which bends to extend rearward from the left side wall of the cylinder head 33 is connected to an exhaust muffler 24 attached to the left portion of the rear frame 5.

Figure 5:
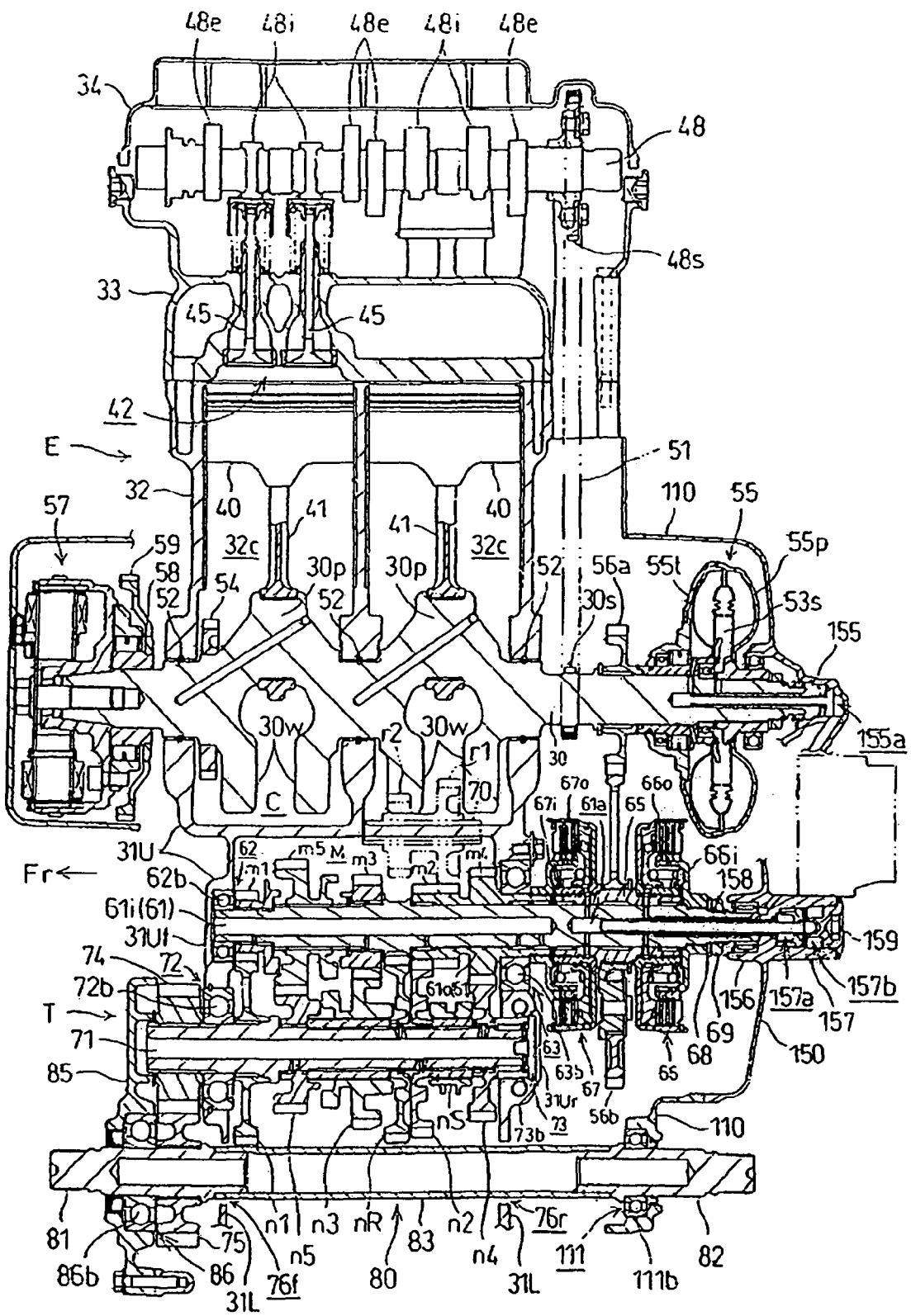
FIG. 5 is a sectional view of the power unit taken along line V-V in FIG. 3 and viewed in the direction of arrows.

Referring to FIGS. 3 to 5, pistons 40 fitted with two of respective cylinder bores 32c of the cylinder block portion 32 so as to be reciprocally slidable therethrough. Connecting rods 41 connect crank pins 30p between crank webs 30w and 30w to a piston pin 40p of the piston 40 to form a crank mechanism.

In the cylinder head 33, a combustion chamber 42 is formed opposite the piston 40 in each of the cylinder bores 32c, an intake port 43 which opens to the combustion chamber 42 so as to be opened and closed by a pair of intake valves 45 extends upward to the right, and an exhaust port 44 which is opened and closed by a pair of exhaust valves 46 extends forward. The cylinder head 33 is further provided with a spark plug 47 which faces the combustion chamber 42. The intake pipe 20 is connected to the intake port 43.

The upper end of the intake valve 45 abuts on an intake cam rob 48i of the cam shaft 48 rotatably journaled in the cylinder head 33. One end of a rocker arm 50 journaled to a rocker arm shaft 49 is in contact with an exhaust cam rob 48e of the cam shaft 48. The upper end of the exhaust valve 46 abuts on the other end of the rocker arm 50.

The intake valves 45 and the exhaust valves 46 open and close the intake port 43 and the exhaust port 44, respectively at a predetermined timing by the cam shaft 48 in synchronization with the rotation of the crankshaft 30.

As shown in FIG. 5, the cam shaft 48 has its rear portion fitted with a cam sprocket 48s, and a timing chain 51 is set between the drive sprocket 30s fitted with the portion around the rear end of the crankshaft 30 and the cam sprocket 48s. Accordingly, the cam shaft 48 is driven to be rotated at a rotation speed which is half of a rotation speed of the crankshaft 30.

The crankshaft 30 is rotatably journaled between the upper crankcase 31U and the lower crankcase 31L via a plane bearing 52. The drive sprocket 30s is formed at the rear portion of the crankshaft 30 extending to the rear of the crank chamber. A primary drive gear 56a is disposed in the rear end of the drive sprocket 30s via a fluid coupling 55.

The fluid coupling 55 includes a pump impeller 55p fixed to the crankshaft 30, a turbine runner 55t opposite thereto, and a stator 53s.

The primary drive gear 56a is coupled to the turbine runner 55t which is rotatable with respect to the crankshaft 30. The power from the crankshaft 30 is transmitted to the primary drive gear 56a via a work fluid.

The primary drive gear 56a is in mesh with a primary driven gear 56b jounaled to a main shaft 61 to be described later so as to transmit the rotation of the crankshaft 30 to a main shaft 61.

Meanwhile, an AC generator 57 and a start-up driven gear 59 are jounaled to the front portion of the crankshaft 30 extending from a crank chamber C via a one-way clutch 58.

A balancer shaft drive gear 54 is fitted to a portion of the crankshaft 30 along the inner surface of the front side wall of the crank chamber C.

A transmission chamber M is formed by partitioning the crank chamber C with a partition wall at the left side of the crank chamber C for storing the crank web 30w of the crankshaft 30. The crankcase 31 partially forms the transmission case.

A transmission gear mechanism 60 stored in the transmission chamber M is a constant-mesh type gear mechanism. The main shaft 61 is jounaled to the upper crankcase 31U at the upper diagonal position to the left of the crankshaft 30, and a counter shaft 71 is journaled between the split surfaces of the upper and lower crankcases 31U and 31L at the lower diagonal position to the left of the main shaft 61 (see FIGS. 3 and 4).

The main shaft 61 is formed of an inner cylinder 61i and an outer cylinder 61o which is rotatably fit with a portion of the inner cylinder 61i. A front end of the inner cylinder 61i is rotatably journaled to a bearing recess portion 62 formed in the front side wall 31Uf in the transmission chamber M of the upper crankcase 31U while interposing a first bearing 62b. The outer cylinder 61o is rotatably fit with a substantial center of the inner cylinder 61i relatively at the rear side. The outer cylinder 61o is partially rotatably journaled to a bearing opening 63 formed in the rear side wall 31Ur in the transmission chamber M so as to be supported together with the inner cylinder 61i while interposing a second bearing 63b.

The outer cylinder 61o has a second transmission drive gear m2 and a fourth transmission drive gear m4 integrally formed in the longitudinal direction inward of the second bearing 63b, and has an outer portion protruded outside the second bearing 63b.

A first transmission drive idle gear m1, a fifth transmission drive gear m5 integrated with a shifter spline fitted with the inner cylinder 61i, and a third transmission drive idle gear m3 are journaled to the inner cylinder 61i sequentially arranged to the front of the second and the fourth transmission drive gears m2 and m4 of the outer cylinder 61o. An outer portion of the inner cylinder 61i protrudes further to the rear of the outer portion of the outer cylinder 61o.

The bearing recess portion 62 formed in the front side wall 31Uf has a small inner diameter for journaling the front end of the small-diameter inner cylinder 61i. The bearing opening 63 formed in the rear side wall 31Ur has a large inner diameter than that of the fourth transmission drive gear m4 at the rear end so as to be used for assembling the main shaft 61.

The bearing opening 63 of the rear side wall 31Ur in the transmission chamber M has an inward flange 63f with its inner opening end slightly protruded toward the center axis. The inner diameter of the flange 63f is larger than that of the fourth transmission drive gear m4.

An input sleeve 65 in line with the outer cylinder 61o is rotatably fitted with the outer portion of the inner cylinder 61i, and the primary driven gear 56b is fitted with the center of the input sleeve 65 such that the primary driven gear 56b is in mesh with the primary drive gear 56a at the side of the crankshaft 30.

A first transmission clutch 66 is assembled to the rear of the primary driven gear 56b of the input sleeve 65, and a second transmission clutch 67 is assembled to the front of the primary driven gear 56b.

The first transmission clutch 66 and the second transmission clutch 67 are hydraulic multiple friction clutches each having the same structure.

In the first transmission clutch 66, a bowl-like clutch outer 66o which is opened to the rear side is integrally fitted with the input sleeve 65, and a clutch inner 66i is integrally fitted with the inner cylinder 61i.

Meanwhile, in the second transmission clutch 67, a bowl-like clutch outer 67o which is opened to the front side is integrally fitted with the input sleeve 65, and a clutch inner 67i is integrally fitted with the outer portion of the outer cylinder 61o.

Upon supply of the hydraulic pressure to the first transmission clutch 66 to couple the clutch outer 66o with the clutch inner 66i, the rotation of the input sleeve 65 integrated with the primary driven gear 56b is transmitted to the rotations of the second and the fourth transmission drive gears m2 and m4 on the outer cylinder 61o. When the supply of the hydraulic pressure is stopped, the clutch outer 66o and the clutch inner 66i are decoupled so as not to transmit the rotation to the second and the fourth transmission drive gears m2 and m4 on the outer cylinder 61o.

Similarly, upon supply of the hydraulic pressure to the second transmission clutch 67 to couple the clutch outer 67o with the clutch inner 67i, the rotation of the input sleeve 65 integrated with the primary driven gear 56b is transmitted to the inner cylinder 61i. When the supply of the hydraulic pressure is stopped by rotating the fifth transmission drive gear m5 spline fitted with the inner cylinder 61i, the clutch outer 67o and the clutch inner 67i are decoupled so as not to transmit the rotation to the fifth transmission drive gear m5 on the inner cylinder 61i.

A counter shaft 71 journaled between the split surfaces of the upper and the lower crankcases 31U and 31L at the lower diagonal position to the left of the main shaft 61 has the front portion rotatably journaled to the bearing opening 72 formed in the front side wall 31Uf in the transmission chamber M while interposing the bearing 72b, and has the rear end portion rotatably journaled to the bearing recess portion 73 formed in the rear side wall 31Uf in the transmission chamber M while interposing the bearing 73b.

The counter shaft 71 has the first transmission driver gear n1, the fifth transmission drive idle gear n5, the third transmission drive gear n3 integrated with the shifter and spline fitted with the counter shaft 71, the reverse idle gear nR, the second transmission driven idle gear n2, the shifter nS and the fourth transmission driven idle gear n4 which are journaled in arrangement in the order from the front to the rear in the transmission chamber M.

The corresponding transmission drive gear and the transmission driven gear are in the constant mesh state.

A reverse idle shaft 70 is disposed above the counter shaft 71 (see FIGS. 3 and 4). A reverse large-diameter gear r1 and a reverse small diameter gear r2 are rotatably journaled to the reverse idle shaft 70. The reverse large-diameter gear r1 is in mesh with the second transmission drive gear m2 on the main shaft 61, and the reverse small-diameter gear r2 is in mesh with the reverse idle gear nR on the counter shaft 71.

The fifth transmission drive gear m5 on the main shaft 61 and the third transmission driven gear n3 on the counter shaft 71 are shifter gears. Those two shifter gears and the shifter nS on the counter shaft 71 are moved in the axial direction by the transmission drive mechanism to establish the gear shifting speed.

The first and the third gear shifting speeds are established by the longitudinal movement of the fifth transmission drive gear m5, the fifth gear shifting speed and the reverse are established by the longitudinal movement of the fifth transmission drive gear m5. The second and the fourth gear shifting speeds are established by the longitudinal movement of the shifter nS.

The power transmission among the respective transmission gear shifting speeds is performed under the gear speed selection control and the control for the first and the second transmission clutches 66, 67.

The front end of the counter shaft 71 protrudes forward of the bearing 72b, and is spline fitted with an output gear 74.

The output shaft 80 is disposed below the counter shaft 71 in the right diagonal direction (see FIG. 3). A driven gear 75 spline fitted with the front portion of the output shaft 80 is in mesh with the output gear 74 at the front end of the counter shaft 71 such that the power is transmitted from the counter shaft 71 to the output shaft 80.

The output gear 74 at the front end of the counter shaft 71 in mesh with the driven gear 75 of the output shaft 80 receives the large load. Accordingly, the bearing 72b for journaling the front portion of the counter shaft 71 is structured to have relatively a large size.

A front case cover 85 is applied to cover across the split surfaces on the front surface to which the counter shaft 71 and the output shaft 80 of the separated upper and lower crankcases 31U and 31L protrude. A rear case cover 150 is applied to the rear surfaces of the upper and the lower crankcases 31U and 31L across the split surfaces to cover the fluid coupling 55 at the rear end of the crankshaft 30, and the first and the second transmission clutches 66, 67 at the rear end of the main shaft 61 via a spacer 110 partially serving as the case cover.

The output shaft 80 is formed by connecting the front end supported portion 81 and the rear end supported portion 82 which are forged with a hollow cylindrical member 83. The front end supported portion 81 is penetrated into a through hole 76f formed in the front side wall 31Lf of the lower crankcase 31L such that the front end is protruded from the front case cover 85 forward to be journaled to the bearing opening 86 formed in the case cover 85 while interposing the bearing 86b. The rear end supported portion 82 is penetrated into the through hole 76r formed in the rear side wall 31Lr of the lower crankcase 31L such that the rear end protrudes rearward from the spacer 110 by interposing the bearing 111b in the bearing opening 111 formed in the spacer 110.

The output shaft 80 has the front end supported portion 81 and the rear end supported portion 82 protruded forward and rearward to be rotatably supported at the case cover 85 and the spacer 110, respectively. Specifically, the front through hole 76f is adjacent to the bearing opening 72 at the front of the counter shaft 71.

The driven gear 75 is spline fitted with the driven gear 75 adjacent to the inside of the bearing 85b.

The output gear 74 at the front end of the counter shaft 71 is in mesh with the driven gear 75 spline fit with the front supported portion 81 of the output shaft 80 such that the power is transmitted from the counter shaft 71 to the output shaft 80.

A balancer shaft 90 is journaled to the right of the crankshaft 30 interposed between the split surfaces of the upper and the lower crankcases 31U and 31L (see FIG. 3).

The driven gear 93 spline fitted with the balancer shaft 90 is in mesh with a balancer shaft drive gear 54 such that the rotation of the crankshaft 30 is transmitted to the balancer shaft 90 at the same rotation speed.

The rotation of the balancer shaft 90 at the same rotation speed as that of the crankshaft 30 serves to negate the primary oscillation resulting from the reciprocating movement of the piston 40.

A transmission drive mechanism 200 for performing gear shifting by moving a shifter of the transmission gear mechanism 60 of the transmission T is disposed below the crankshaft 30 and the main shaft 61.

A gear case portion is formed at the lower portion of the rear case cover 150, and covered with a gear case cover 201 from the rear side to provide a reduction gear mechanism inside. A transmission electric motor 202 is attached to the right of the gear case cover 201 from the rear side. A shift spindle 206 is provided at the left lower portion, which penetrates the front and rear walls of the lower crankcase 31L and the rear case cover 150. It has the rear end protruded from the gear case cover 201 rearward.

Figure 7:
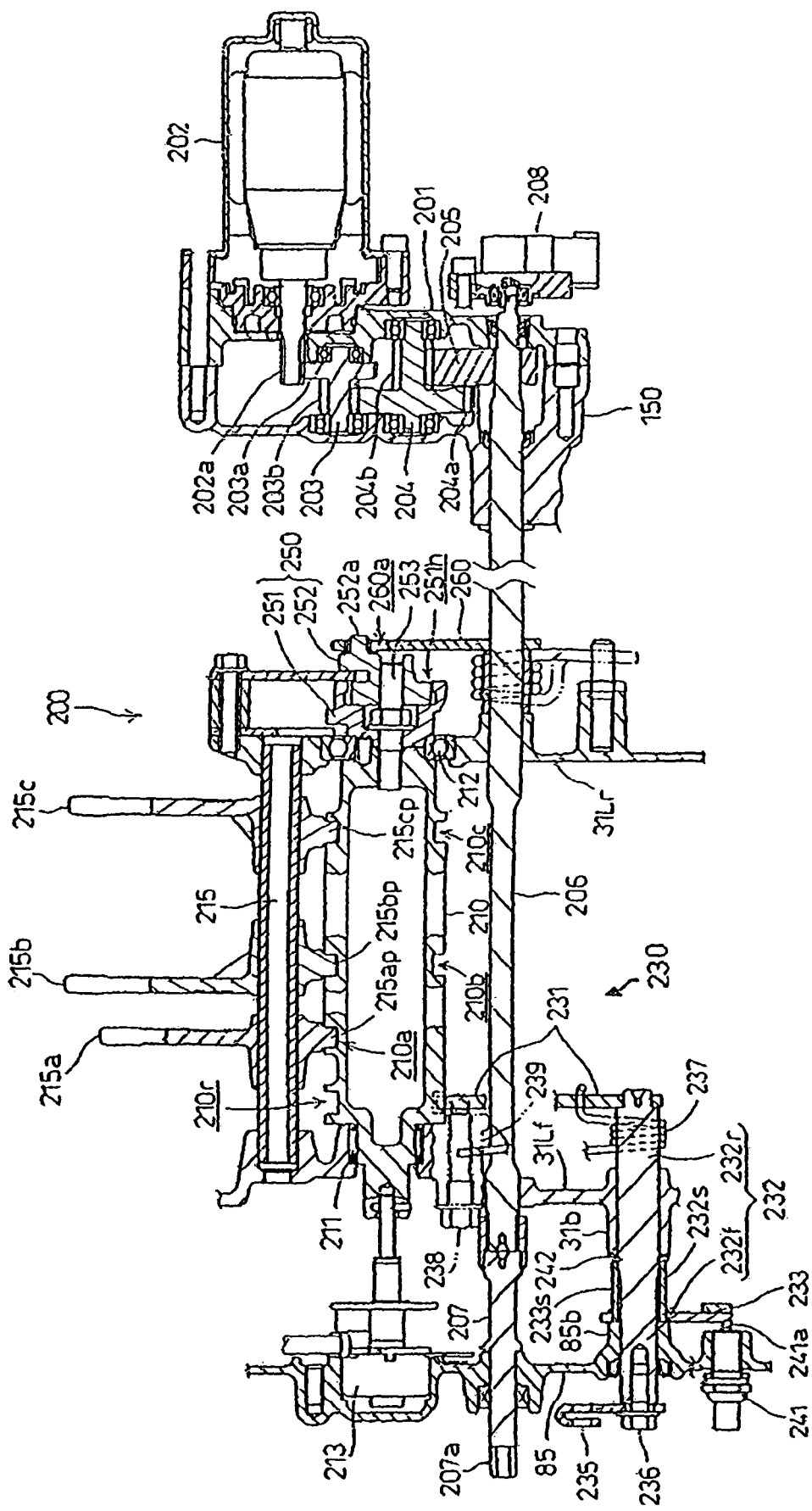
FIG. 7 is a sectional view taken along line VII-VII in FIG. 6 and viewed in the direction of arrows.

An angular sensor 208 fixed to the rear case cover 201 is attached to the rear end of the shift spindle 206 (see FIG. 7).

An extended spindle 207 is coaxially linked with a front end of the shift spindle 206, which protrudes through the front side wall 31Lf of the lower crankcase 31L. The extended spindle 207 is penetrated through the front case cover 85. The front end extending forward forms an engagement portion 207a formed into a hexagonal column shape.

A first idle gear shaft 203 and a second idle gear shaft 204 are rotatably journaled in the gear case. A small-diameter drive gear 202a formed on a motor drive shaft which protrudes forward from the gear cover 201 of the transmission electric motor 202 is in mesh with a large-diameter gear 203a integrated with the first idle gear shaft 203. A small-diameter gear 203b integrated with the first idle gear 203 is in mesh with a large-diameter gear 204a integrated with the second idle gear shaft 204. A small-diameter gear 204b integrated with the second idle gear shaft 204 is in mesh with a fan-like gear shift arm 205 fitted with the shift spindle 206. The reduction gear mechanism, thus, is structured.

The speed for driving the transmission electric motor 202 is decelerated via the reduction gear mechanism to rotate the shift spindle 206.

A shift drum 210 is rotatably journaled at the upper diagonal position of the shift spindle 206 between the front and rear side walls 31Lf and 31Lr of the lower crankcase 31L via the bearings 211 and 212.

A drum center 251 of a pole ratchet mechanism 250 is coupled with the rear end, jounaled to the bearing 212, of the shift drum 210 by the rotation center shaft 253 coaxially so as to protrude rearward.

A shifter 252 which keeps a ratchet pole retractable is rotatably journaled to the rotation center shaft 253 to be fitted in a ratchet housing 251h of the drum center 251 so as to structure the pole ratchet mechanism 250.

A proximal end portion of the shift arm 260 is fitted with the shift spindle 206, and a protrusion 252a that protrudes to the rear of the shifter 252 is engaged with a long hole 260a formed in the swinging distal end of the shift arm 260.

When the shift arm 260 integrally swings by the rotation of the shift spindle 206, engagement of the long hole 260a with the protrusion 252a rotates the shifter 252. The rotation of the shifter 252 serves to rotate the drum center 251 intermittently via the pole ratchet mechanism 250 such that the shift drum 210 integrated with the drum center 251 is rotated.

Figure 8:
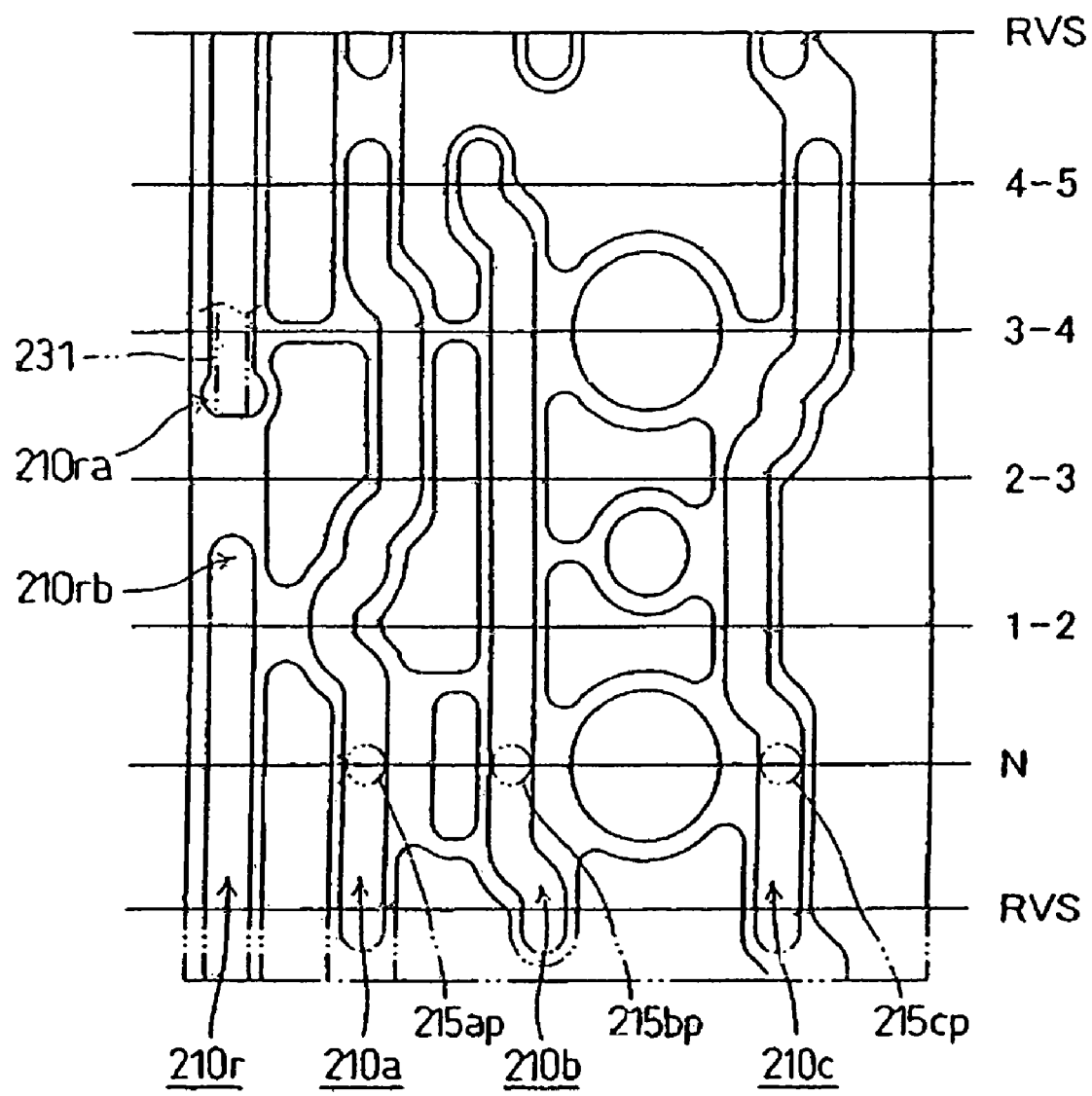
FIG. 8 is a development view showing a shift drum of the reverse inhibitor mechanism.

Referring to FIGS. 7 and 8, three transmission lead grooves 210a, 210b and 210c and a reverse inhibitor groove 210r at the front end are formed in the outer circumferential surface of the shift drum 210.

Shift pins 215ap, 215bp and 215cp of the shift forks 215a, 215b and 215c slidably supported on the guide shaft 215 are fitted with the respective three transmission lead grooves 210a, 210b and 210c formed in the shift drum 210. As the shift drum 210 rotates, the shift fork 215a which axially moves while being guided by the lead groove further moves the shifter gear (fifth transmission drive gear m5) on the main shaft 61. The shift forks 215b and 215c move the shifter gear (third transmission driven gear n3) and the shifter nS on the counter shaft 71 to effectively change the gear set for the power transmission to perform the gear shifting.

The reverse inhibitor groove 210r formed in the front end of the outer circumferential surface of the shift drum 210 is detachably engaged with the distal end of the reverse inhibitor arm 231 (see FIGS. 6 and 7), discussed herein later.

The rotation angle of the shift drum 210 is detected by the shift position detector 213 coaxially disposed to the front of the shift drum 210.

As the transmission electric motor 202 is driven by the transmission drive mechanism 200, the shift spindle 206 is rotated via the reduction gear mechanism such that the shift drum 210 is further rotated via the shift arm 260 and the pole ratchet mechanism 250. The rotation of the shift drum 210 performs gear shifting by moving the shift forks 215a, 215b and 215c in the axial direction.

A hexagonal column shaped engagement portion 207a of the spindle extended shaft 207 protruding forward from the front case cover 85 is engaged with an operation portion of the hexagonal hole of the wrench as the rotary operation instrument to rotate the front case cover 85 along the surface. This makes it possible to rotate the shift spindle 206 to manually perform the gear shifting.

The transmission T equipped with the above-structured transmission drive mechanism 200 further includes a reverse inhibitor mechanism 230 for inhibiting selection of the reverse gear during the normal traveling of the vehicle.

As described above, the reverse inhibitor groove 210r is formed in the outer circumferential surface of the shift drum 210 such that the distal end of the reverse inhibitor arm 231 is detachably engaged with the reverse inhibitor groove 210r.

Figure 6:
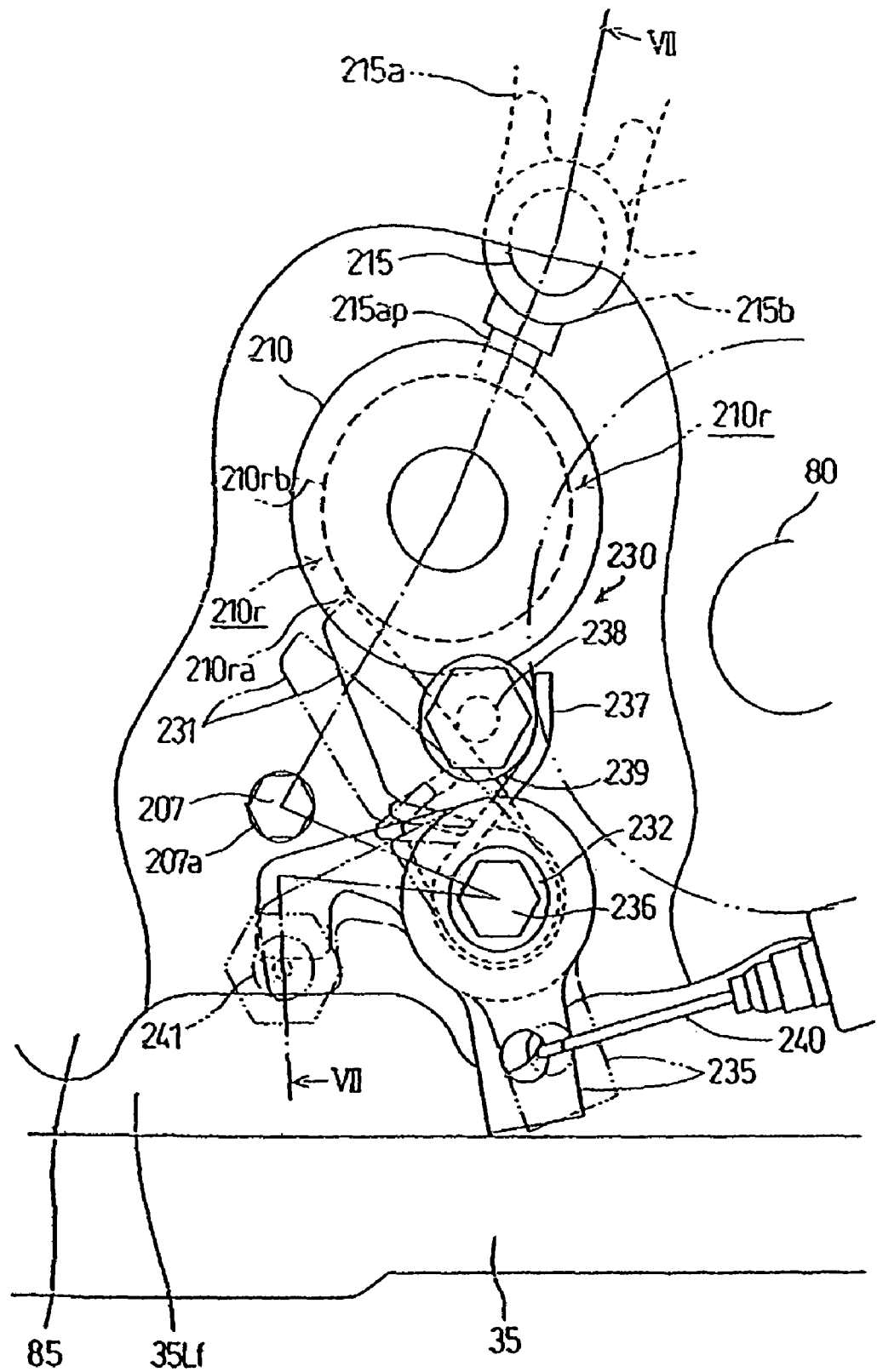
FIG. 6 is a front view of the power unit showing an essential portion of a reverse inhibitor mechanism of the present invention.

Referring to FIGS. 6 and 7, the front side wall 31Lf of the opposing front and rear side walls 31Lf and 31Lr of the lower crankcase 31L includes a cylindrical bearing boss portion 31b below the shift drum 210, into which the reverse inhibitor shaft 232 is inserted so as to be rotatably journaled in the position oriented to the longitudinal direction. The reverse inhibitor shaft 232 is cantilevered during assembly (also during operation) of the reverse inhibitor mechanism.

The proximal end portion of the reverse inhibitor arm 231 is fitted with the rear end (first end) portion of the reverse inhibitor shaft 232. The rear end (first end) side of the reverse inhibitor shaft 232 with which the reverse inhibitor arm 231 is fitted has a diameter larger than that of the front end (second end) side. The large-diameter rear half portion 232r is journaled to the bearing boss portion 31b.

The front half portion 232f of the reverse inhibitor shaft 232 has a diameter smaller than that of the rear half portion 232r of the reverse inhibitor shaft 232. The front half portion 232f is penetrated into the cylindrical boss portion 85b having the front case cover 85 formed thereon so as to protrude forwardly.

A spline groove 232s is formed in the rear side portion of the front half portion 232f of the reverse inhibitor shaft 232. A sleeve 233s for integrally supporting the swing arm 233 is spline fitted with the spline groove 232s such that the front side portion is inserted into the cylindrical boss portion 85b of the front case cover 85 through the spline groove 232s of the first half portion 232f. A lever 235 is screwed to the front end of the reverse inhibitor shaft 232 using a bolt 236.

A torsion spring 237 is wound between the portion journaled to the bearing boss portion 31b of the rear half portion 232r of the reverse inhibitor shaft 232, and a rear end with which the reverse inhibitor arm 231 is fitted such that one end of the torsion spring 237 is fixed to the reverse inhibitor arm 231, and the other end is fixed to a bolt boss portion 239 to which the stopper bolt 238 formed between the reverse inhibitor shaft 232 and the shift drum 210 is attached, e.g., screwed.

Referring to FIG. 6, the reverse inhibitor arm 231 is urged in clockwise direction such that the distal end of the reverse inhibitor arm 231 abuts the outer circumferential surface of the shift drum 210. The size and shape of the reverse inhibitor groove 210r of outer circumferential surface of the shift drum 210 corresponds to the distal end portion of the reserve inhibitor arm. i.e., the distal end of the reveres inhibitor arm 231 abuts the reverse inhibitor groove 210r such that the distal end portion of the reverse inhibitor arm 231 is operatively engaged with the reverse inhibitor groove 210r.

The reverse inhibitor arm 231 urged by the torsion spring 237 has its distal end engaged with the reverse inhibitor groove 210r at the stopped position in abutment on the stopper bolt 238. The reverse inhibitor arm 231 is dimensioned such that it does not to press the bottom surface of the reverse inhibitor groove 210r.

As shown in FIG. 8, the reverse inhibitor groove 210r is linearly formed, on the outer circumferential surface of the shift drum 210, without deviating from the axial direction thereof. The reverse inhibitor groove 210r is not continuously formed over a whole circumference of the shift drum 210. The reverse inhibitor groove 210r includes groove end portions 210ra and 210rb. Between these groove end portions 210ra, 210rb no groove is formed on outer portion of the shift drum.

On the outer circumferential surface of the shift drum 210, three transmission lead grooves 210a, 210b and 210c are formed. The shift pins 215ap, 215bp and 215cp of the shift forks 215a, 215b and 215c are engaged with the transmission lead grooves 210a, 210b and 210c, respectively. The gear shifting speeds are set by the circumferential positions of the shift pins 215ap, 215bp and 215cp axially aligned in a single line with respect to the outer circumferential surface of the shift drum 210, i.e., six circumferential positions including the reverse (RVS), neutral (N), 1-2 speed, 2-3 speed, 3-4 speed, and 4-5 speed.

When the shift pins 215ap, 215bp and 215cp are set on the circumferential position at the 1-2 speed, the gear combination of the transmission gear mechanism 60, that is, the first gear speed and the second gear speed are selected. Selection of the gear speed from the first and the second gear speeds may be determined under the selection control between the first transmission clutch 66 and the second transmission clutch 67.

FIG. 8 shows a neutral state where the shift pins 215ap, 215bp and 215cp are set (indicated by the chain double-dashed line) on the circumferential position of the neutral (N). At this time, the distal end of the reverse inhibitor arm 231 (indicated by the chain double-dashed line) exists in the groove end portion 210ra of the reverse inhibitor groove 210r. In the aforementioned state, the distal end of the reverse inhibitor arm 231 abuts on the end surface of the groove end 210ra of the reverse inhibitor groove 210r to inhibit the rotation even if an attempt is made to further rotate the shift drum 210 toward the reverse side.

During the normal traveling where the distal end of the reverse inhibitor arm 231 is engaged with the reverse inhibitor groove 21r, the reverse inhibitor mode is selected to prevent easy transition from the neutral (N) to the reverse.

As shown in FIGS. 3 and 6, an end portion of the cable 240 extending along the front case cover 85 from the left is connected to the lever 235 fixed to the front end of the reverse inhibitor shaft 232 which protrudes forward of the front case cover 85. When the cable 240 is pulled, the lever 235 operates to rotate the reverse inhibitor shaft 232 in a counterclockwise direction against the torsion spring 237. The reverse inhibitor arm 231 integrated with the reverse inhibitor shaft 232 rotates in counterclockwise direction to allow the distal end of the reverse inhibitor arm 231 to be disengaged from the reverse inhibitor groove 210 such that the reverse inhibitor state is released.

A limit switch 241 is attached to a predetermined position (left in FIGS. 3 and 6) of the reverse inhibitor shaft 232 to the right of the front case cover 85, and the operation element 241a protrudes to the rear of the limit switch 241. When the cable 240 is pulled to release the reverse inhibitor state, the distal end of the swing arm 233 spline fitted with the reverse inhibitor shaft 232 serves to activate the operation element 241a to turn on the limit switch 241 (ON position).

When the limit switch 241 outputs an ON signal indicating to release the reverse inhibitor state, a lamp is illuminated to notify a driver with respect to the release of the reverse inhibitor state.

As the aforementioned reverse inhibitor mechanism 230 is provided, the driver releases the reverse inhibitor state by pulling the cable 240 first so as to allow the transition to the reverse.

The method assembling the reverse inhibitor mechanism 230 is discussed below.

The torsion spring 237 is wound around rear end of the reverse inhibitor shaft 232, where the reverse inhibitor arm 231 is fitted thereto. The front end of the reverse inhibitor shaft 232 is penetrated inside the lower crankcase 31L so as to be rotatably journaled to the bearing boss portion 31b of the front side wall 31Lf of the lower crankcase 31L.

At the same time, one end of the torsion spring 237 is fixed to the bearing boss portion 31b, and the other end of the torsion spring 237 is fixed to the reverse inhibitor arm 231 to rotate the reverse inhibitor arm 231 against the spring force of the torsion spring 237 to bring the distal end of the reverse inhibitor arm 231 into engagement with the reverse inhibitor groove 210r formed in the outer circumferential surface of the shift drum 210.

During the assembling operation, the spring force of the torsion spring 237 serves to maintain the state where the distal end of the reverse inhibitor arm 231 is engaged with the reverse inhibitor groove 210r of the shift drum 210. This makes it possible to establish the stable temporary fixed state of the reverse inhibitor arm while maintaining the reverse inhibitor shaft 232 axially positioned.

The reverse inhibitor shaft 232 and the reverse inhibitor arm 231 may be assembled within inside of the transmission case without supporting the reverse inhibitor shaft 232 in an unstable temporary fixed state. This makes it possible to provide excellent assembly workability with respect to the reverse inhibitor mechanism 230.

As a C-clip 242 is latched to the reverse inhibitor shaft 232 along the front end surface of the bearing boss portion 31b, the rearward movement of the reverse inhibitor shaft 232 may be reliably prevented.

When the front case cover 85 covers the front side wall 31Lf of the crankcase 31, the sleeve 233s of the swing arm 233 is spline fitted with the spline groove 232s in the front half portion 232f of the reverse inhibitor shaft 232 which protrudes forwardly from the bearing boss portion 31b of the front side wall 31Lf. Then the front case cover 85 is applied such that the reverse inhibitor shaft 232 is penetrated into the cylindrical boss portion 85b of the front case cover 85. After that, the lever 235 is screwed to the front end surface of the reverse inhibitor shaft 232 with the bolt 236. Thus, assembling of the reverse inhibitor mechanism is completed.

When the swing arm 233 is fitted with the reverse inhibitor shaft 232 from the front side to be covered with the front case cover 85, the reverse inhibitor shaft 232 is latched with the C-clip 242 so as not to move rearward, resulting in easy assembly work and improved workability.

As the rear end side of the reverse inhibitor shaft 232, with which the reverse inhibitor arm 231 is fitted has a diameter larger than that of the front end, rigidity of the reverse inhibitor shaft 232 may easily be maintained while making the diameter of the front end side smaller to further reduce the weight.

As the reverse inhibitor groove 210r is formed in the outer circumferential surface as well as the transmission lead grooves 210a, 210b and 210c, the shift drum may be formed compact compared with the structure where the reverse inhibitor groove is specifically formed in the protruding portion at the end portion of the shift drum.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A reverse inhibitor mechanism for a transmission of a vehicle, said reverse inhibitor mechanism comprising:
   a shift drum journaled to a side wall of a crankcase and rotatably supported in the crankcase; said shift drum having a reverse inhibitor groove formed in an outer circumferential surface thereof;
   a shift fork operated by the shift drum;
   a reverse inhibitor arm detachably engaged with the reverse inhibitor groove; said reverse inhibitor arm adapted to regulate a reverse setting of gear shifting of the transmission; and
   a reverse inhibitor shaft which supports the reverse inhibitor arm thereon;
   wherein said reverse inhibitor shaft is rotatably journaled in the crankcase by inserting one end thereof into one of the opposite side walls of the crankcase from inside the crankcase while keeping the reverse inhibitor arm positioned within the transmission case; and
   wherein a distal end portion of the reverse inhibitor arm which swings by a rotation of the reverse inhibitor shaft is brought into a detachable engagement with the reverse inhibitor groove; and wherein a proximate end of the reverse inhibitor arm is fitted at one end portion of the reverse inhibitor shaft.

2. A reverse inhibitor mechanism for a transmission of a vehicle according to claim 1, further comprising an urging spring; wherein the reverse inhibitor arm is urged by the urging spring to swing towards the reverse inhibitor groove of the shift drum.

3. A reverse inhibitor mechanism for a transmission of a vehicle according to claim 1,
   wherein said one end portion of the reverse inhibitor shaft having the reverse inhibitor arm fitted thereon has a diameter larger than that of the other end portion of the reverse inhibitor shaft.

4. A reverse inhibitor mechanism for a transmission of a vehicle according to claim 2,
   wherein said one end portion of the reverse inhibitor shaft having the reverse inhibitor arm fitted thereon has a diameter larger than that of the other end portion of the reverse inhibitor shaft.

5. A power unit for an all terrain vehicle, said power unit comprising
   a crankcase having a front side wall and a rear side wall; and
   a reverse inhibitor mechanism disposed in the crankcase;
   wherein said reverse inhibitor mechanism comprises
      a shift drum disposed between the front side wall and the rear side wall of the crankcase; said shift drum having a reverse inhibitor groove formed in an outer circumferential surface thereof;
      a reverse inhibitor shaft having a first end portion and a second end portion; said second end portion attached to one of the front side wall and the rear side wall of the crankcase; and
      a reverse inhibitor arm having a proximal end and a distal end;
      wherein said proximal end of the reverse inhibitor arm is attached to the first end portion of the reverse inhibitor shaft, and said distal end thereof is operable to engage with the reverse inhibitor groove of the shift drum via rotation of the reverse inhibitor shaft.

6. A power unit for an all terrain vehicle according to claim 5, wherein the reverse inhibitor mechanism further comprises an urging spring; and wherein the distal end of the reverse inhibitor arm is urged by the urging spring to swing towards the reverse inhibitor groove of the shift drum.

7. A power unit for an all terrain vehicle according to claim 5, wherein the first end portion of the reverse inhibitor shaft has a diameter larger than that of the second end portion thereof.

8. A power unit for an all terrain vehicle according to claim 6, wherein the first end portion of the reverse inhibitor shaft has a diameter larger than that of the second portion thereof.

9. A power unit for an all terrain vehicle according to claim 5, wherein said one of the front side wall and the rear side wall of the crankcase comprises a bearing boss portion; and wherein the reverse inhibitor shaft is journaled in the bearing boss portion and protrudes forwardly therefrom.

10. A power unit for an all terrain vehicle according to claim 5, wherein the reverse inhibitor groove is formed at an end portion of the shift drum.

11. A power unit for an all terrain vehicle according to claim 5, wherein the shift drum further comprises a plurality of transmission lead grooves formed in the outer circumferential surface thereof.

12. A power unit for an all terrain vehicle according to claim 5, further comprising a C-clip latched to the reverse inhibitor shaft.

* * * * *